UNITED STATES PATENT OFFICE.

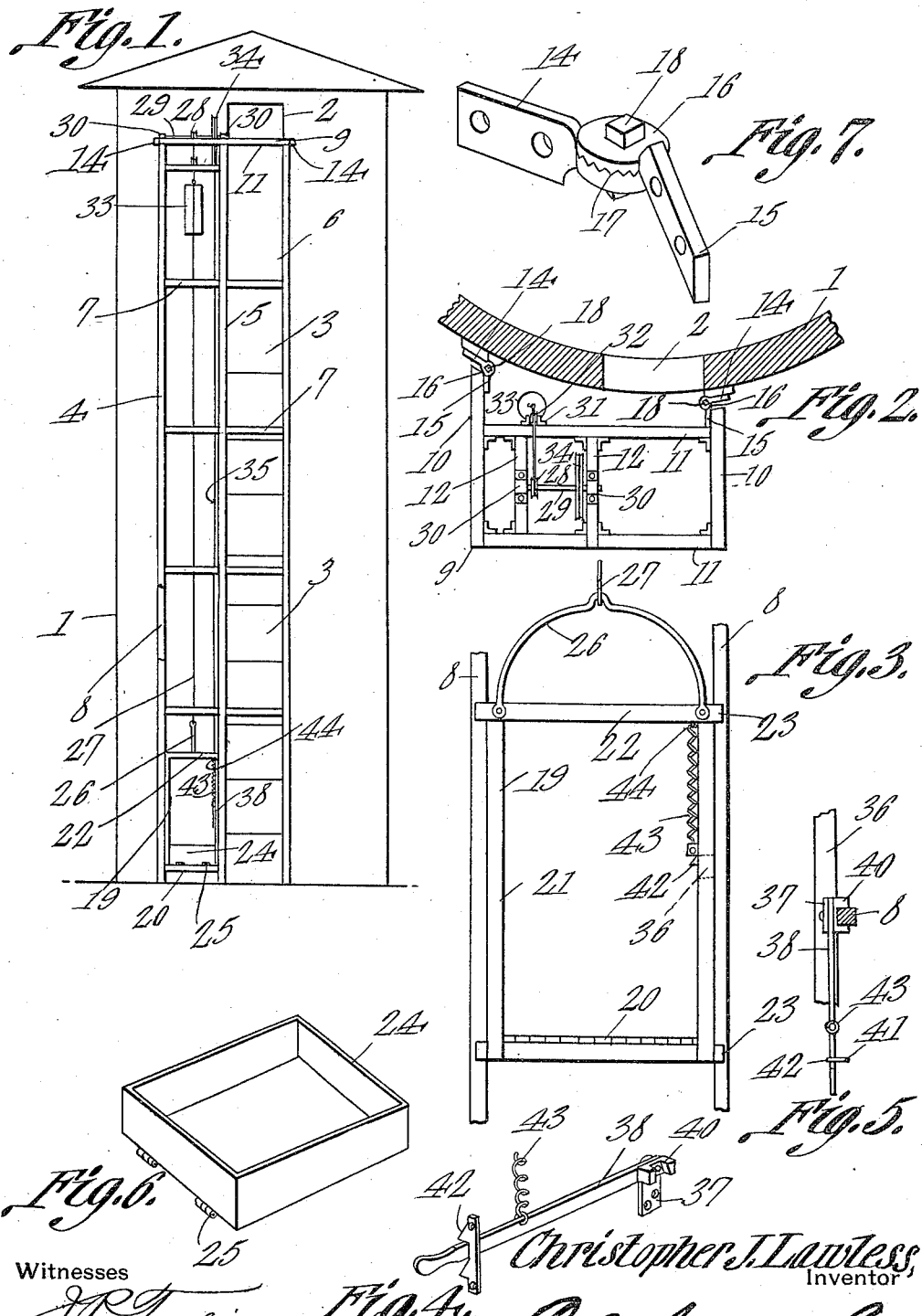

CHRISTOPHER J. LAWLESS, OF LINCOLN, NEBRASKA.

SILO-ELEVATOR.

1,045,301.     Specification of Letters Patent.     Patented Nov. 26, 1912.

Application filed January 11, 1912. Serial No. 670,702.

*To all whom it may concern:*

Be it known that I, CHRISTOPHER J. LAWLESS, a citizen of the United States, residing at Lincoln, in the county of Lancaster and State of Nebraska, have invented a new and useful Silo-Elevator, of which the following is a specification.

In removing ensilage from silos, considerable difficulty has been experienced heretofore, by reason of the fact that the operator is compelled, whenever ensilage is to be removed, to ascend the ladder which is commonly connected with the side of the silo. This operation necessitates a considerable loss of time, and is attended with more or less danger and inconvenience.

The present invention aims to provide a means whereby the operator may be automatically raised and lowered, with respect to a silo, a vertically moving, weight-actuated carrier being provided, which carrier includes a device adapted to receive a comparatively small quantity of ensilage, thereby to cause a lowering of the carrier, and to overcome the effect of a counterpoise weight whereby the carrier and the operator are lifted.

A further object of the invention is to provide novel means for assembling an elevator frame with silos of different radii.

A further object of the invention is to provide novel means for controlling the movement of the carrier.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in elevation, a silo to which the device of the present invention has been applied; Fig. 2 is a transverse, horizontal section; Fig. 3 is an elevation of the carrier and of the guides upon which the carrier reciprocates; Fig. 4 is a perspective of a locking device for holding the carrier against movement; Fig. 5 is a fragmental horizontal section of the carrier, showing the locking device engaged with one of the guides; Fig. 6 is a perspective of the receptacle which constitutes a part of the carrier; and Fig. 7 is a perspective showing one form of means whereby the elevator frame may be connected with the silo.

In the accompanying drawings, the numeral 1 denotes a silo, having the usual longitudinally extended opening 2, closed by a series of superposed doors 3.

In carrying out the invention there is provided a frame consisting of a series of uprights denoted by the numerals 4, 5 and 6, these uprights being located at the front of the frame, and being duplicated at the rear of the frame, adjacent the silo, as will be readily understood. The uprights 4 and 5, upon the one hand, and the uprights 5 and 6 upon the other hand, may be connected by tie bars 7. Extended longitudinally of the frame are upright guides 8, the guides 8 extending from the ground upwardly to a top, denoted generally by the numeral 9, and shown in Fig. 2. It is upon these guides 8 that the carrier, hereinafter described, is mounted to slide.

The top 9 comprises side bars 10 and longitudinal bars 11, connecting the side bars, the longitudinal bars 11 being connected by intermediate bars 12. The ends of the side bars 10 protrude beyond the inner longitudinal bar 11, and a means is provided whereby the protruding extremities of the side bars 10 may be connected with silos having different curvatures. The means above described, is shown most clearly in Fig. 7.

Referring to Fig. 7, a pair of coöperating members 14 and 15 are shown, the same terminating in rectangularly disposed heads 16, having upon their abutting faces, interfitting ribs 17, a clamping device, preferably taking the form of a bolt and nut structure, being employed for holding the heads 16 together pivotally. The member 15 is attached to one of the side bars 10, and the member 14 is attached to the outer face of the silo. By loosening the bolt and nut structure 18, the member 14 may be swung about, so as to bear evenly against the outer face of the silo, whereupon the bolt and nut structure 18 may be tightened, thereby causing the interfitting ribs 17 of the heads 16 to lock together.

The carrier is denoted generally by the numeral 19, and comprises a platform 20 and an upper frame 22, side bars 21 connecting the platform 20 with the upper frame 22, the upper frame 22 and the platform 20 carrying outstanding jaws 23, adapted to slide upon the guides 8.

A receptacle, denoted by the numeral 24, rests upon the platform 20, the receptacle 24 being hingedly connected with the platform 20, as shown at 25. Fixed to the upper portion 22 of the carrier 19, is a bail 26, to which is secured a flexible element 27, trained over a pulley 28, carried by a shaft 29, journaled for rotation in bearings 30, carried by the intermediate bars 12. The flexible element 27 is trained over a pulley 32, carried by a hanger 31, supported by the rear longitudinal bar 11, the free end of the flexible element 27 carrying a counterweight 33.

Secured to the shaft 29 is a wheel 34, of considerably larger diameter than the pulley 28, an endless flexible element 35 being trained about the wheel 34, the flexible element 35 extending in close relation to the carrier 19, so that the occupant of the carrier may, at will, actuate the shaft 29, to effect a raising of the carrier.

Secured to one of the transverse beams 36, which constitute a part of the carrier 19, is a plate 37, to which is pivoted a lever 38, provided at its pivotally supported end with a notched jaw 40, receiving one of the guides 8 slidably. Attached to one of the portions 21 of the carrier, is a locking plate 41, having a projection 42, beneath which the free end of the lever 38 may be engaged. The lever 38 is normally swung upwardly, at its free end, by means of a retractile spring 43, connected with the intermediate portion of the lever 38 and with any accessible portions of the carrier 21, as shown at 44. The structure shown in Fig. 4 constitutes a brake for limiting the movement of the carrier, and, as will be readily understood without specific delineation, any number of these brakes may be provided.

The operation of the device is as follows: The counterpoising member 33 is of sufficient weight so that when the receptacle 24 is empty, the member 33 will effect an elevation of the carrier 19, together with the operator, the weight of the member 33 being just sufficient to overcome the weight of the carrier and the weight of the operator. The spring 43 normally actuates the lever 38 so that the jaw 40 will engage the guide 8, and prevent the carrier from moving. The operator, taking his stand in the receptacle 24, depresses the free end of the lever 38, thus putting the spring 43 under tension, the hold of the jaw 40 upon the guide 8 being loosened. If desired, the lever 38 may be engaged at its free end under the projection 42. When the parts are positioned as above described, the counterpoising member 33 will effect an elevation of the carrier and the operator, to the top of the silo, the elevating of the operator and the carrier taking place slowly, owing to the fact that the weight of the member 33 but slightly exceeds the weight of the operator and the weight of the carrier. When the operator has been elevated to the top of the silo, or to any point intermediate the top and the bottom of the silo, depending upon the height of the ensilage in the silo, the lever 38 is released, whereupon the jaw 40 will engage one of the guides 8, and hold the carrier in position. The operator then enters the silo, and pitches out the desired quantity of ensilage, a small jag of ensilage being thrown into the receptacle 24. The ensilage which is deposited in the receptacle 24 will, when the operator stands upon the carrier, be sufficient to cause the carrier to move downward, slowly, the downward movement being controlled by means of the brake mechanism 38—40, as will be understood readily. If, at any time, it should be necessary to raise the ensilage manually, this result may be effected through the medium of the flexible element 35 and the wheel 34, over which the flexible element is trained, these members constituting means for manually operating the shaft 29, so as to assist the weight 33 in effecting an elevation of the carrier. Owing to the construction shown in Fig. 7, the supporting frame in which the carrier slides, may be connected readily with silos of different radii; and by manipulating the structure shown in Fig. 4, the movement of the carrier may be regulated to a nicety, it being possible to lock the carrier in its lowermost position. After the carrier has been moved downwardly, under the added increment of the ensilage which is placed in the receptacle 24, the carrier may be locked in position, as hereinbefore described, whereupon the receptacle 24 may be swung over upon its hinged mounting 25, to effect a dumping of the ensilage which is within the receptacle 24. Thereupon, the structure will be rendered efficient to raise the operator, so soon as the brake mechanism 38—40 is released.

Having thus described the invention, what is claimed is:—

1. In an elevator, a frame; a carrier mounted to slide therein; and hingedly connected members, one of which is secured to the frame, the other of which is movable, to permit connection with supporting structures of different radii.

2. In an elevator, a frame; a carrier mounted to slide vertically therein; and means for connecting the frame with supporting structures of different radii, said means consisting of coöperating members having rectangularly disposed heads provided in their abutting faces with interlocking elements, and a clamping device adjustably uniting the heads, one of said members being secured to the frame, and the other of said elements being adapted for connection with the outer face of the supporting structure.

3. An elevator adapted for automatically raising and lowering an operator with respect to a storage structure, and comprising a frame; a carrier mounted to slide in the frame; a weight operatively connected with the carrier, to raise the carrier and an operator; a movable receptacle mounted upon the carrier, and adapted to receive a portion of the contents of the storage structure, whereby the carrier and the operator will be carried downwardly; and means accessible from the carrier, for controlling the movement of the carrier.

In testimony that I claim the foregoing as my own, I have hereto affixed my signature in the presence of two witnesses.

CHRISTOPHER J. LAWLESS.

Witnesses:
ELLA HETRICK,
JOHN J. LEDWITH.

Copies of this patent may be obtained for five cents each, by addressing the "Commissioner of Patents, Washington, D. C."